United States Patent
Chiu

(10) Patent No.: US 11,308,007 B2
(45) Date of Patent: Apr. 19, 2022

(54) APPARATUS AND METHOD AND COMPUTER PROGRAM PRODUCT FOR EXECUTING HOST INPUT-OUTPUT COMMANDS

(71) Applicant: Silicon Motion, Inc., Zhubei (TW)

(72) Inventor: Shen-Ting Chiu, Miaoli County (TW)

(73) Assignee: SILICON MOTION, INC., Zhubei (TW)

(*) Notice: Subject to any disclaimer, the term of this patent is extended or adjusted under 35 U.S.C. 154(b) by 205 days.

(21) Appl. No.: 16/854,413

(22) Filed: Apr. 21, 2020

(65) Prior Publication Data

US 2021/0011723 A1 Jan. 14, 2021

Related U.S. Application Data

(60) Provisional application No. 62/872,372, filed on Jul. 10, 2019.

(30) Foreign Application Priority Data

Oct. 16, 2019 (CN) .......................... 201910984351.3

(51) Int. Cl.
*G06F 13/16* (2006.01)
*G06F 12/02* (2006.01)
(Continued)

(52) U.S. Cl.
CPC ...... *G06F 13/1668* (2013.01); *G06F 9/30065* (2013.01); *G06F 9/546* (2013.01);
(Continued)

(58) Field of Classification Search
CPC .. G06F 13/1668; G06F 13/1694; G06F 13/28; G06F 12/0246; G06F 12/0835; G06F 9/30065; G06F 9/546
See application file for complete search history.

(56) References Cited

U.S. PATENT DOCUMENTS

| | | | |
|---|---|---|---|
| 6,871,341 B1 | 3/2005 | Shyr | |
| 7,032,228 B1 * | 4/2006 | McGillis | G06F 3/0607 709/217 |

(Continued)

FOREIGN PATENT DOCUMENTS

| | | |
|---|---|---|
| CN | 106201335 A | 12/2016 |
| TW | 200604827 A | 2/2006 |

(Continued)

OTHER PUBLICATIONS

English translation of the Taiwanese Search Report for Application No. 108137240, dated Nov. 13, 2020.

(Continued)

*Primary Examiner* — Tracy A Warren
(74) *Attorney, Agent, or Firm* — Birch, Stewart, Kolasch & Birch, LLP

(57) ABSTRACT

The invention introduces a method for executing host input-output (IO) commands, performed by a processing unit of a device side when loading and executing program code of a first layer, at least including: receiving a slot bit table (SBT) including an entry from a second layer, where each entry is associated with an IO operation; receiving a plurality of addresses of callback functions from the second layer; and repeatedly executing a loop until IO operations of the SBT have been processed completely, and, in each iteration of the loop, calling the callback functions implemented in the second layer for a write operation or a read operation of the SBT to drive the frontend interface through the second layer.

20 Claims, 9 Drawing Sheets

(51) Int. Cl.
  *G06F 12/0831* (2016.01)
  *G06F 13/28* (2006.01)
  *G06F 9/30* (2018.01)
  *G06F 9/54* (2006.01)

(52) U.S. Cl.
  CPC ...... *G06F 12/0246* (2013.01); *G06F 12/0835* (2013.01); *G06F 13/1694* (2013.01); *G06F 13/28* (2013.01)

(56) References Cited

U.S. PATENT DOCUMENTS

| | | |
|---|---|---|
| 7,840,719 B2 | 11/2010 | Casper et al. |
| 9,176,672 B2 | 11/2015 | Zhao et al. |
| 2006/0015688 A1 | 1/2006 | Schnapp et al. |
| 2008/0086631 A1 | 4/2008 | Chow et al. |
| 2008/0320214 A1 | 12/2008 | Ma et al. |
| 2011/0213921 A1 | 9/2011 | Yu et al. |
| 2012/0110242 A1 | 5/2012 | Tsai et al. |
| 2015/0120701 A1* | 4/2015 | Schmidt ................ G06F 16/245 707/722 |
| 2015/0339154 A1* | 11/2015 | Wen ........................ G06F 9/54 718/102 |
| 2016/0291897 A1* | 10/2016 | Bae ....................... G06F 3/0604 |
| 2016/0350003 A1 | 12/2016 | Kanno |
| 2017/0075824 A1* | 3/2017 | Haen ..................... G06F 3/0661 |
| 2017/0075832 A1 | 3/2017 | Bhimani et al. |
| 2017/0228157 A1 | 8/2017 | Yang et al. |

FOREIGN PATENT DOCUMENTS

| | | |
|---|---|---|
| TW | 200622634 A | 7/2006 |
| TW | 200915090 A | 4/2009 |
| TW | M369528 U1 | 11/2009 |
| TW | 201232255 A1 | 8/2012 |
| TW | 201812591 A | 4/2018 |

OTHER PUBLICATIONS

English Translation of Taiwanese Search Report for Taiwanese Application No. 108137284, dated Oct. 12, 2020.

* cited by examiner

APPARATUS AND METHOD AND COMPUTER PROGRAM PRODUCT FOR EXECUTING HOST INPUT-OUTPUT COMMANDS

CROSS-REFERENCE TO RELATED APPLICATIONS

This application claims the benefit of priority to U.S. Provisional Application Ser. No. 62/872,372, filed on Jul. 10, 2019; and Patent Application No. 201910984351.3, filed in China on Oct. 16, 2019; the entirety of which is incorporated herein by reference for all purposes.

BACKGROUND

The disclosure generally relates to storage devices and, more particularly, to an apparatus, a method, and a computer program product for executing host input-output commands.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

In the Embedded Multi-Media Card (eMMC) 5.1 specification, for different application requirements, a host may issue different types of host Input-Output (IO) commands, such as simple read/write commands, package-read/write commands, command queues, etc., to a storage device for requesting the storage device to read/program data. However, the host and the storage device need to use different protocols to exchange different types of host IO commands, data to be programmed into a flash memory module, data has been read from the flash memory module, or others. Conventionally, the storage device implements different firmware modules for transmitting and receiving commands, addresses and data with the host under different protocols. Thus, it is desirable to have an apparatus, a method, and a computer program product for executing host IO commands with a single firmware module.

SUMMARY

In an aspect of the invention, an embodiment introduces a method for executing host input-output (IO) commands, performed by a processing unit of a device side when loading and executing program code of a first layer, at least including: receiving a slot bit table (SBT) comprising an entry from a second layer, where each entry is associated with an IO operation; receiving addresses of callback functions from the second layer; and repeatedly executing a loop until IO operations of the SBT have been processed completely, and, in each iteration of the loop, calling the callback functions implemented in the second layer for a write operation or a read operation of the SBT to drive the frontend interface through the second layer to interact with the host side to transmit user data read from a storage unit to the host side, or receive user data to be programmed into the storage unit from the host side.

In another aspect of the invention, an embodiment introduces a non-transitory computer program product for executing host IO commands when executed by a processing unit of a device side. The non-transitory computer program product at least includes program code of a first layer to: receive a SBT comprising an entry from a second layer, where each entry is associated with an IO operation; receive addresses of callback functions from the second layer; and repeatedly execute a loop until IO operations of the SBT have been processed completely, and, in each iteration of the loop, call the callback functions implemented in the second layer for a write operation or a read operation of the SBT to drive the frontend interface through the second layer to interact with the host side to transmit user data read from a storage unit to the host side, or receive user data to be programmed into the storage unit from the host side.

In still another aspect of the invention, an embodiment introduces an apparatus for executing host IO commands, at least including: a frontend interface coupled to a host side; and a processing unit coupled to the frontend interface. The processing unit is arranged to operably perform operations when loading and executing program code of a first layer: receiving a SBT comprising an entry from a second layer, where each entry is associated with an IO operation; receiving addresses of callback functions from the second layer; and repeatedly execute a loop until IO operations of the SBT have been processed completely. In each iteration of the loop, the processing unit is arranged to operably call the callback functions implemented in the second layer for a write operation or a read operation of the SBT to drive the frontend interface through the second layer to interact with the host side to transmit user data read from a storage unit to the host side, or receive user data to be programmed into the storage unit from the host side.

The callback functions are implemented for stages of a generic framework in response to different types of host IO commands.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
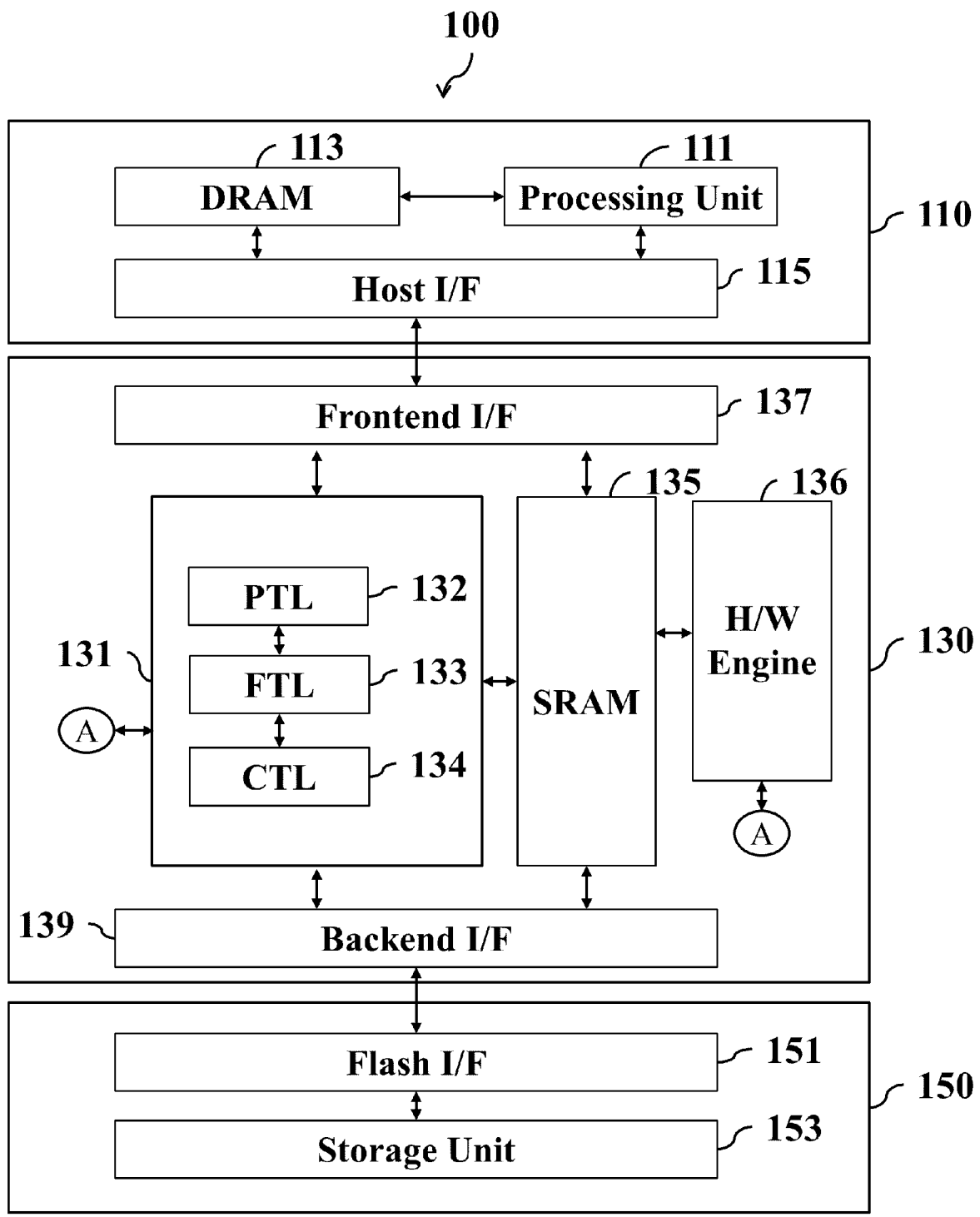
FIG. 1 is the flash system architecture according to an embodiment of the invention.

Refer to FIG. 1. The electronic apparatus 100 includes a host side 110, a controller 130 and a storage device 150, and the controller 130 and the storage device 150 may be collectively referred to as a device side. The electronic apparatus 100 may be equipped with a Personal Computer (PC), a laptop PC, a tablet PC, a mobile phone, a digital camera, a digital recorder, or other consumer electronic products. A host interface (I/F) 115 of the host side 110 and a frontend I/F 137 of the controller 130 may communicate with each other by Embedded Multi-Media Card (eMMC) protocol. A backend I/F 139 of the controller 130 and a flash I/F of the storage device 150 may communicate with each other by a Double Data Rate (DDR) protocol, such as Open NAND Flash Interface (ONFI), DDR Toggle, or others. The host side 110 includes a processing unit 111 issuing different types of host Input-Output (IO) commands to the controller 130 through the host I/F 115 in terms of requests made by applications, such as simple read/write commands, package-read/write commands, command queues, etc. The host side 110 includes a Dynamic Random Access Memory (DRAM) 113 for allocating space as data buffer storing user data that is to be written into the storage device 150 and has been read from the storage device 150. The controller 130 includes a processing unit 131 receiving different types of host commands from the host side 110 through the frontend I/F 137 and accordingly advising the storage device 150 through the backend I/F 139 to perform operations, such as data reads, writes, erases, etc. Any of the processing units 111 and 131 may be implemented in numerous ways, such as with general-purpose hardware (e.g., a single processor, multiple processors or graphics processing units capable of parallel computations, or others) that is programmed using firmware and/or software instructions to perform the functions recited herein. The controller 130 includes a Static Random Access Memory (SRAM) 135 allocating space as a data buffer storing user data that is to be programmed into a storage unit for host write commands and has been read from the storage unit for host read commands, and storing necessary data in execution, such as variables, data tables, data abstracts, host-to-flash (H2F) tables, flash-to-host (F2H) tables, or others. The backend I/F 139 includes a NAND flash controller (NFC) to provide functions that are required to access to the storage device 150, such as a command sequencer, a Low Density Parity Check (LDPC) encoder/decoder, etc. The controller 130 includes a hardware engine 136 equipped with a wide range of acceleration circuits, allowing the processing unit 131 to employ when executing algorithms and driving the backend I/F 139, such as an Advanced Encryption Standard (AES) encryption engine, an AES decryption engine, a Cyclic Redundancy Check (CRC) encoder, a CRC decoder, etc.

The storage device 150 includes a storage unit 153 for providing huge storage space typically in hundred Gigabytes, or even several Terabytes, for storing a wide range of user data, such as high-resolution images, video files, etc. The storage unit 153 includes control circuits and memory arrays containing memory cells, such as Single Level Cells (SLCs), Multi-Level Cells (MLCs), Triple Level Cells (TLCs), Quad-Level Cells (QLCs), or any combinations thereof. The processing unit 131 programs user data into a designated address (a destination address) of the storage device 150 (specifically, the storage unit 153) and reads user data from a designated address (a source address) thereof through a backend interface (I/F) 139. The backend I/F 139 may use several electronic signals including a data line, a clock signal line and control signal lines for coordinating the command, address and data transfer with the storage device 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
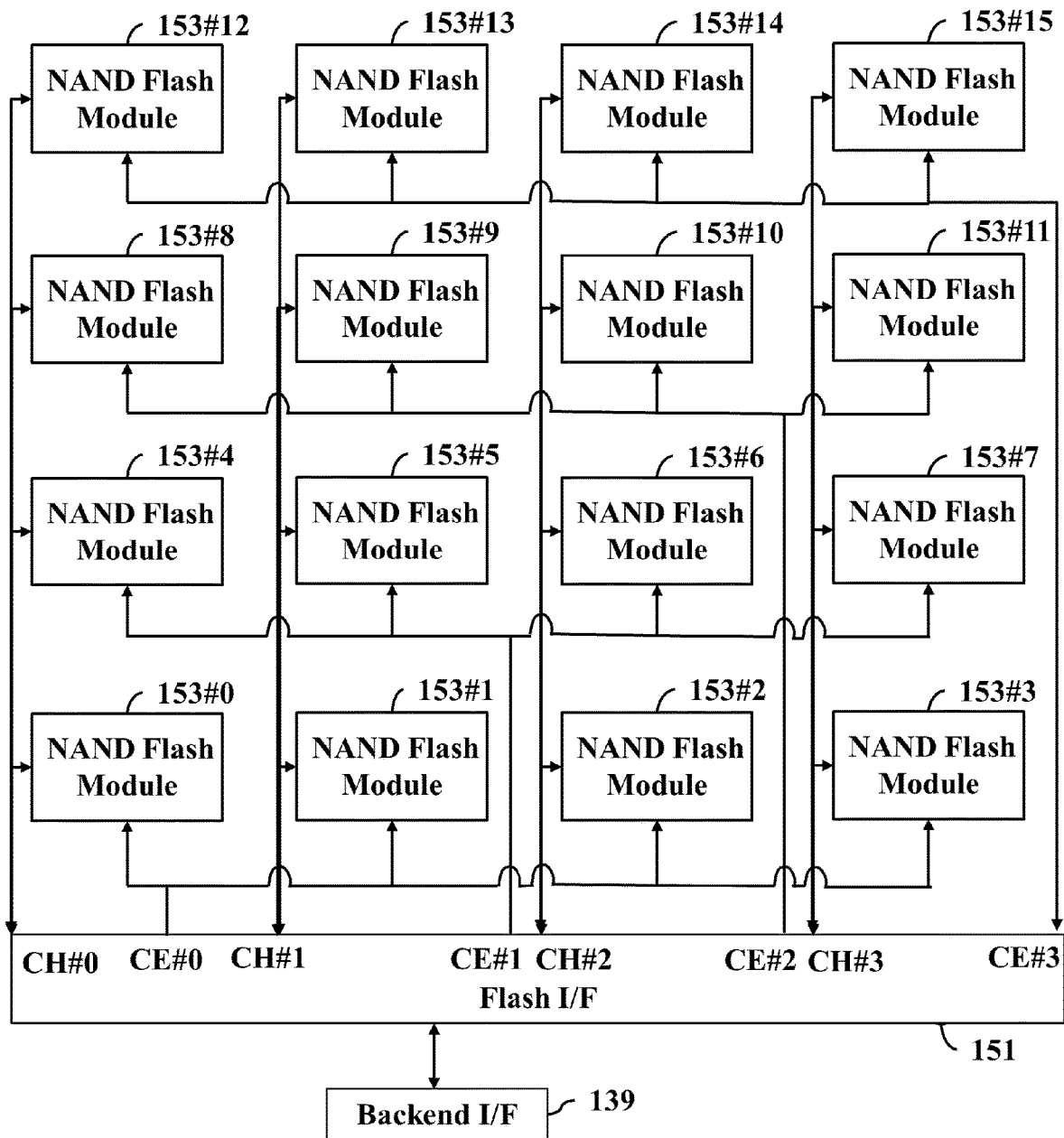
FIG. 2 is a schematic diagram illustrating Logical Unit Numbers (LUNs) connecting to a flash interface.

Refer to FIG. 2. The flash I/F 151 may include four I/O channels (hereinafter referred to as channels) CH #0 to CH #3 and each is connected to four NAND flash modules, for example, the channel CH #0 is connected to the NAND flash modules 1500, 150 #4, 150 #8 and 150 #12. Each NAND flash module can be packaged in an independent die. The backend I/F 139 may issue one of the CE signals CE #0 to CE #3 through the flash I/F 151 to activate the NAND flash modules 1530 to 153 #3, the NAND flash modules 153 #4 to 153 #7, the NAND flash modules 153 #8 to 153 #11, or the NAND flash modules 153 #12 to 153 #15, and read data from or program data into the activated NAND flash modules in parallel.

The frontend I/F 137 coupled to the host I/F 115 through IO pins may include registers, a data buffer, transmitters, receivers, a direct memory access (DMA) controller, and others. The processing unit 131 when loading and executing program instructions of a Protocol Transport Layer (PTL) 132 may instruct the receivers, the transmitters, the DMA controller of the frontend I/F 137, or any combinations thereof to complete specific operations by setting associated registers of the frontend I/F 137. For example, the PTL 132 being executed may instruct the receivers of the frontend I/F 137 to receive signals from the host side 110 and interpret host commands of different types, logical addresses, and others. The PTL 132 being executed may instruct the DMA controller of the frontend I/F 137 to move data of the data buffer of the frontend I/F 137 to a designated address of the SRAM 135 for pushing a host command into a queue, buffering user data to be programmed, or others. The PTL 132 being executed may instruct the DMA controller of the frontend I/F 137 to move data of a designated address of the SRAM 135 to the data buffer of the frontend I/F 137, and instruct the transmitters of the frontend I/F 137 to send the data of the data buffer to the host side 110 for replying with user data that has been read from the storage unit 153 to the host side 110.

The backend I/F 139 coupled to the flash I/F 151 through IO pins may include registers, a data buffer, transmitters, receivers, a DMA controller, and others. The processing unit 131 when loading and executing program instructions of a Controller Layer (CTL) 134 may instruct the receivers, the transmitters, the DMA controller of the backend I/F 139, or any combinations thereof to complete specific operations by setting associated registers of the backend I/F 139.

Moreover, the processing unit 131 when loading and executing program instructions 0f a Firmware Translation Layer (FTL) 134 performs algorithms associated with data read, data write and background operations. The FTL 134 is mainly responsible for mapping Logical Block Addresses (LBAs) come from the host side 110 to physical addresses of the storage device 150 (so-called logical-to-physical mapping). Specifically, all LBAs representing the logical units visible to and managed by the file system of the host side 110 are mapped to a physical location (channel ID, block ID, page ID and sector ID) of the storage device 150. The physical location for an LBA might be dynamically changed in the wear leveling, and other background management algorithms, such as bad block management, garbage collection (GC), etc., to improve the endurance of memory cells of the storage device 150. Moreover, the FTL 134 when being executed may program user data of designated LBAs of the SRAM 135 into designated physical locations of the storage device 150 and read user data of designated LBAs from designated physical locations of the storage device 150 through the backend I/F 139, and store the read data in designated addresses of the SRAM 135.

Taking the eMMC 5.1 specification as an example, one command line (CMD) and eight data lines D[7:0] are provided between the host I/F 115 and the frontend I/F 137, in which D[0] is used by the device side to notify the host side 110 that the device side is busy.

Figure 3A:
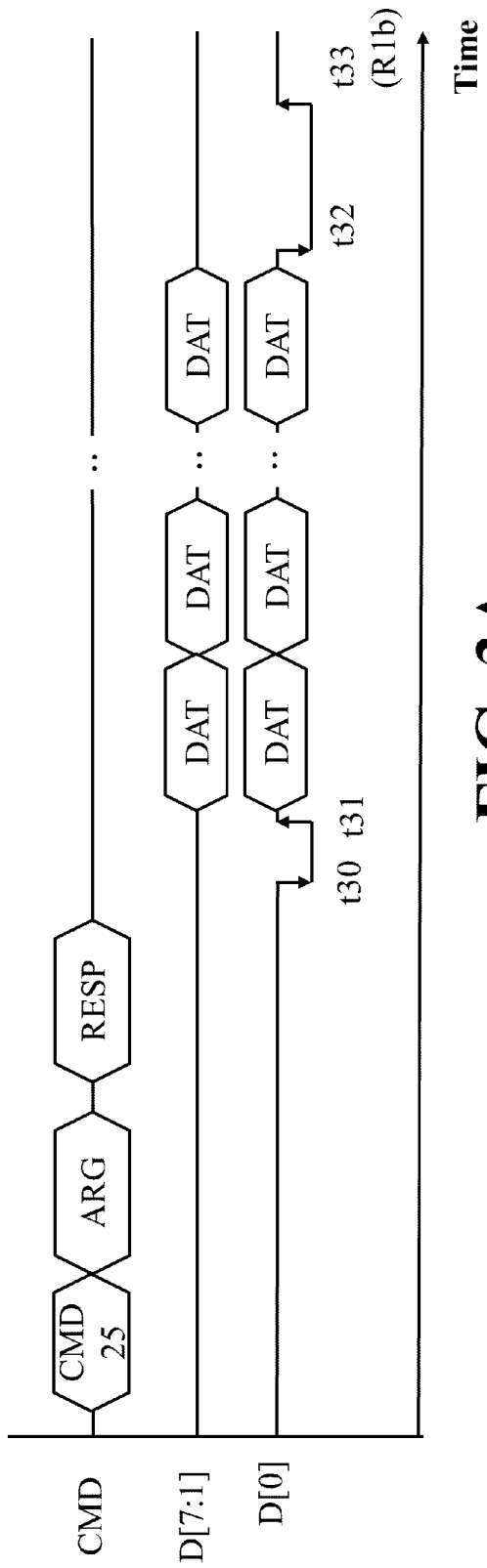
FIG. 3A is a timing diagram for a simple write operation.

In some embodiments, for writing user data of one or more LBAs into the device side, the host side 110 may issue a simple write command to the controller 130. The simple write command may be also referred to as a normal write command. Refer to FIG. 3A. Specifically, the processing unit 111 when executing a driver may issue the command CMD25 (or CMD24) with relevant arguments (ARG) including information about a starting LBA and a length of user data that is to be written to the PTL 132 through the command line of the host I/F 115 for triggering a simple write operation of the device side. Subsequently, the processing unit 131 when executing the PTL 132 may send a response (RESP) through the command line of the frontend I/F 137 for indicating reception statuses of the command and the arguments. Thereafter, the PTL 132 pulls the signal D[0] low for a time period (time points t30 to t31) through the frontend I/F 137 to inform the host side 110 that the device side is busy for preparing to receive user data. Once ready, the PTL 132 releases the signal D[0] through the frontend I/F 137, enabling the processing unit 111 to start a transmission of corresponding user data (DAT) to the device side through D[7:0] of the host I/F 115. After receiving the user data through the frontend I/F 137 completely, the PTL 132 pulls the signal D[0] low for a time period (time points t32 to t33) through the frontend I/F 137 to inform the host side 110 that the device side is busy for processing the received user data. Once the user data has been processed completely, the PTL 132 releases the signal D[0] through the frontend I/F 137, also referred to as a response busy clear (R1$b$), to indicate that the simple write command has been executed completely.

Figure 3B:
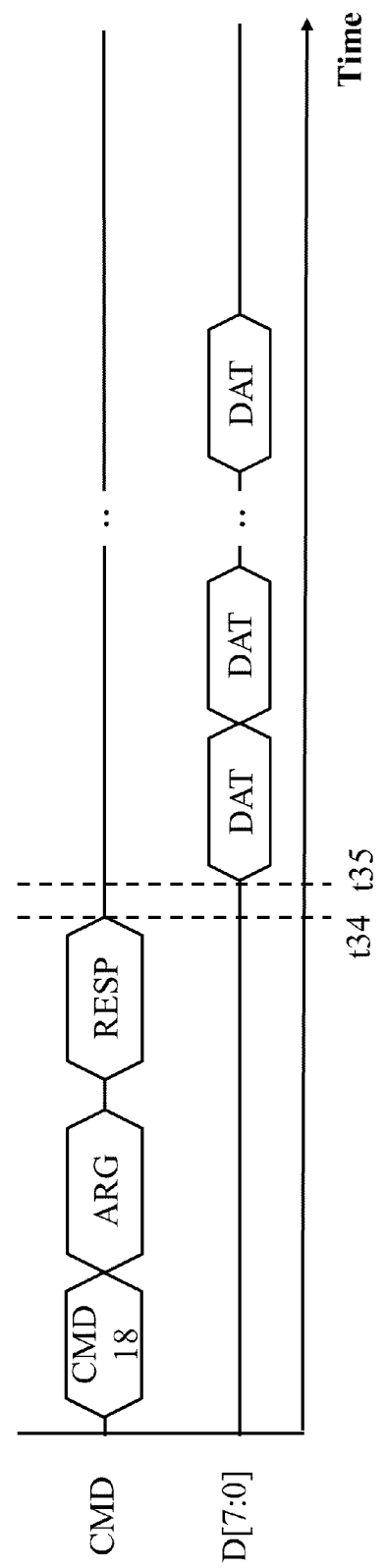
FIG. 3B is a timing diagram for a simple read operation.

In some embodiments, for reading user data of one or more LBAs from the device side, the host side 110 may issue a simple read command to the controller 130. The simple read command may be also referred to as a normal read command. Refer to FIG. 3B. Specifically, the processing unit 111 when executing a driver may issue the command CMD18 (or CMD17) with relevant arguments (ARG) including information about a starting LBA and a length of user data that is to be read to the PTL 132 through the command line of the host I/F 115 for triggering a simple read operation of the device side. Subsequently, the processing unit 131 when executing the PTL 132 may send a response (RESP) through the command line of the frontend I/F 137. After a predefined time period (time points t34 to t35), the PTL 132 may send the user data of the LBAs to the host side through the data lines D[7:0] of the frontend I/F 137. Once all the user data has been transmitted, the simple read command is executed completely.

Figure 4A:
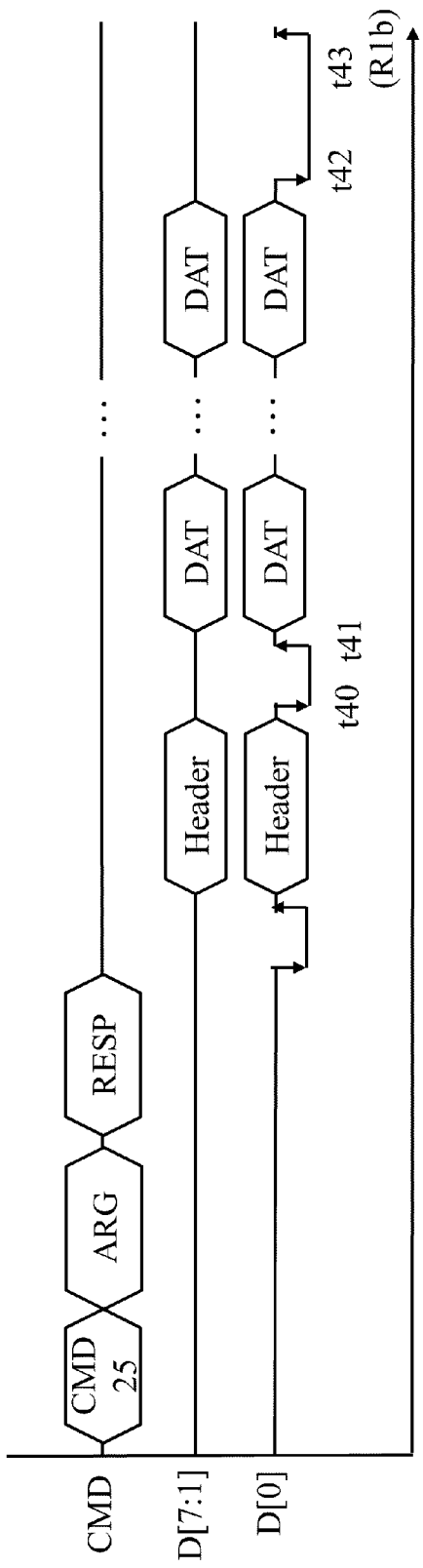
FIG. 4A is a timing diagram for a package-write operation.

In alternative embodiments, for writing user data of multiple packs (at most 64 packs) into the device side, in which each pack includes user data of one or more LBAs, the host side 110 may issue a package-write command to the controller 130. Refer to FIG. 4A. Specifically, the processing unit 111 when executing a driver may issue the command CMD25 and its arguments, such as, information about an indicator of packed commands, a quantity of packed commands of a package header to be sent, etc., to the PTL 132 through the command line for triggering a package-write operation of the device side. Subsequently, the processing unit 131 when executing the PTL 132 may send a response through the command line of the frontend I/F 137. Thereafter, the PTL 132 pulls the signal D[0] low for a time period through the frontend I/F 137 to inform the host side 110 that the device side is busy for preparing to receive a package header. Once ready, the PTL 132 releases the signal D[0] through the frontend I/F 137, enabling the processing unit 111 to start a transmission of a package header to the device side through D[7:0] of the host I/F 115, including information about an operation type (for example, write), a starting LBA, a length and others, for each pack. After sending the package header, the PTL 132 pulls the signal D[0] low for a time period (time points t40 to t41) through the frontend I/F 137 to inform the host side 110 that the device side is busy for preparing to receive user data. Once ready, the PTL 132 releases the signal D[0] through the frontend I/F 137, enabling the processing unit 111 to start a transmission of multiple packs of user data to the device side through D[7:0] of the host I/F 115. Those skilled in the art knows that the writing sequence for user data of a package command cannot be altered. After receiving the user data through the frontend I/F 137 completely, the PTL 132 pulls the signal D[0] low for a time period (time points t42 to t43) through the frontend I/F 137 to inform the host side 110 that the device side is busy for processing the received user data. Once the user data has been processed completely, the PTL 132 releases the signal D[0] through the frontend I/F 137, also referred to as a response busy clear (R1b), to indicate that the package-write command has been executed completely.

Figure 4B:
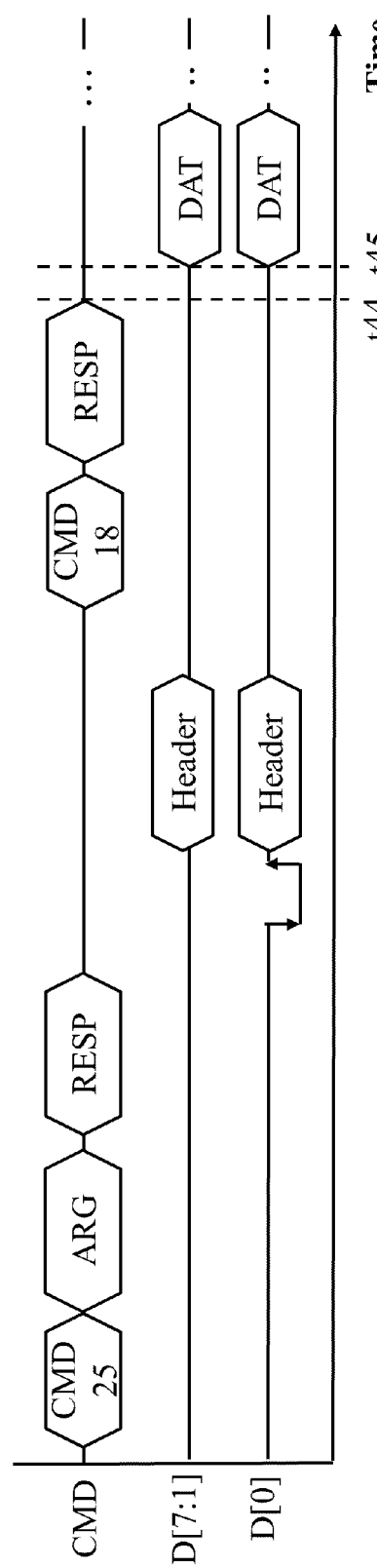
FIG. 4B is a timing diagram for a package-read operation.

In alternative embodiments, for reading user data of multiple packs (for example, 32 packs) from the device side, in which each pack includes user data of one or more LBAs, the host side 110 may issue a package-read command to the controller 130. Refer to FIG. 4B. Specifically, the processing unit 111 when executing a driver may issue the command CMD25 and its arguments, such as, information about an indicator of packed commands, a quantity of packed commands of a package header to be sent, etc., to the PTL 132 through the command line of the host I/F 115 for triggering a package-read operation of the device side. Subsequently, the processing unit 131 when executing the PTL 132 may send a response (RESP) through the command line of the frontend I/F 137. Thereafter, the PTL 132 pulls the signal D[0] low for a time period through the frontend I/F 137 to inform the host side 110 that the device side is busy for preparing to transmit a package header. Once ready, the PTL 132 releases the signal D[0] through the frontend I/F 137, enabling the processing unit 111 to start a transmission of a package header to the device side through D[7:0] of the host I/F 115, including information about an operation type (for example, read), a starting LBA, a length and others, for each pack. After sending the package header, the processing unit 111 may issue multiple commands CMD18 (or CMD17) in a sequence to the PTL 132 through the data lines of the host I/F 115 for triggering multi-pack read operations described in the package header by the device side. After receiving each command CMD18, the processing unit 131 when executing the PTL 132 may send a response (RESP) to the host side 110 through the command line of the frontend I/F 137. It is to be noted that, since the information about the starting LBA and the length of each pack has been sent to the device side via the package header, the processing unit 111 does not spend time and bandwidth to send relevant arguments for each command CMD18 (or CMD17) to the device side. After a predefined time period (time points t44 to t45), the PTL 132 may send one pack of user data to the host side 110 through the data lines D[7:0] to the frontend I/F 137. Those skilled in the art knows that the reading sequence for user data of a package command cannot be altered. The package-read command is executed completely when the last pack of user data has been sent completely.

Figure 5A:
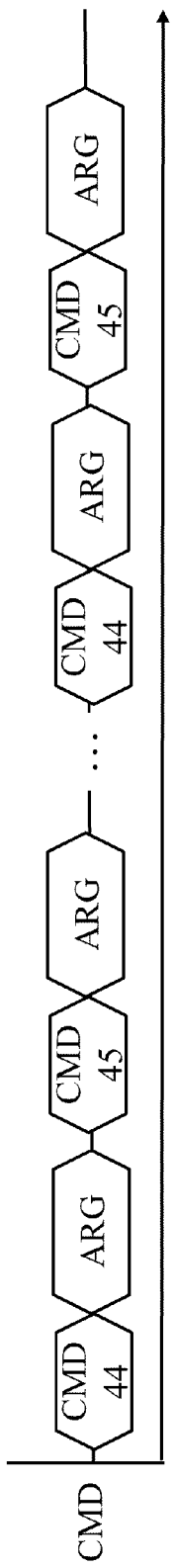
FIG. 5A is a timing diagram for arranging a command queue.

In aforementioned simple or packed read or write operation, those artisans realize that the command line is idle during the transmissions of the user data or the package headers on the data lines. In alternative embodiments, for the utilization of the data lines more efficient, the host side 110 may arrange a command queue including (at most 32) tasks and send the command queue to the controller 130, in which each task advises the controller 130 to read or program user data of one or more LBAs. Refer to FIG. 5A. The processing unit 111 when executing a driver may issue command pairs CMD44 and CMD45 to the PTL 132 through the command line of the host I/F 115 to notify the device side of one task. Specifically, the processing unit 111 issues a command CMD44 with relevant arguments including information about a task number, and others, to the PTL 132, and then issues a command CMD45 with relevant arguments including information about the number, the type (such as read or write) and the data length of this task, and others, to the PTL 132.

Figure 5B:
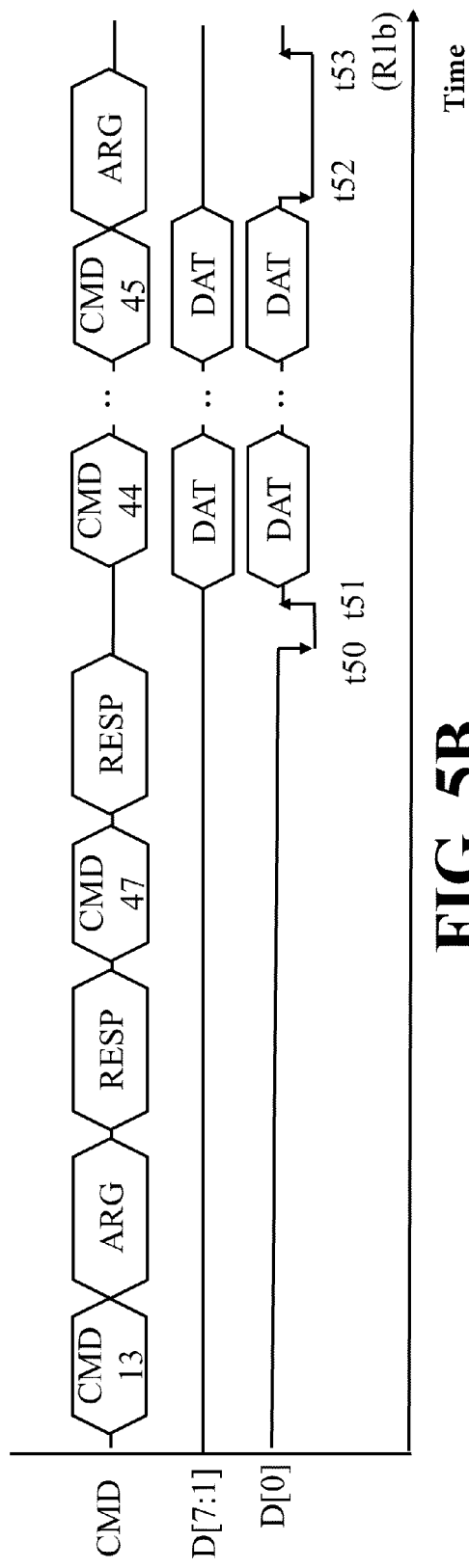
FIG. 5B is a timing diagram for a write task of a command queue.
Figure 5C:
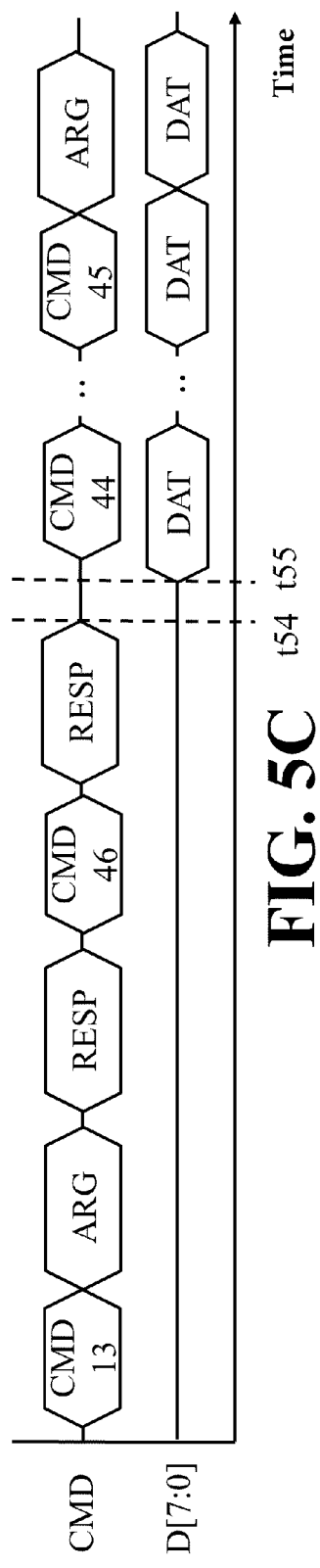
FIG. 5C is a timing diagram for a read task of a command queue.

Refer to FIGS. 5B and 5C. After sending information about one or more tasks of a command queue to the device side, the processing unit 111 may issue a command CMD13 to the device side through the command line of the host I/F 115 periodically or at each specific time point to request the device side to read a value of a Queue Status Register (QSR). The frontend I/F 137 may include a 32-bit QSR and each bit stores a ready state of a corresponding tack of a command queue. For example, the $0^{th}$ bit of the QSR being set to "1" indicates that the $0^{th}$ task of the command queue is ready and the processing unit 111 can drive the device side to start the $0^{th}$ task. The $10^{th}$ bit of the QSR being set to "0" indicates that the $10^{th}$ task of the command queue is not ready and the processing unit 111 cannot drive the device side to start the $10^{th}$ task.

For a write task that has been ready in the command queue, refer to FIG. 5B. Specifically, the processing unit 111 when executing a driver may issue a command CMD47 with relevant information like a task number and others to the PTL 132 through the command line of the host I/F 115 for triggering a specific data reception job performed by the device side. Thereafter, the PTL 132 pulls the signal D[0] low for a time period (time points t50 to t51) through the frontend I/F 137 to inform the host side 110 that the device side is busy for preparing to receive user data. Once ready, the PTL 132 releases the signal D[0] through the frontend I/F 137, enabling the processing unit 111 to start a transmission of user data (DAT) of the corresponding task to the device side through D[7:0] of the host I/F 115. After receiving the user data of the corresponding task through the frontend I/F 137 completely, the PTL 132 pulls the signal D[0] low for a time period (time points t52 to t53) through the frontend I/F 137 to inform the host side 110 that the device side is busy for processing the received user data. Once the user data has been processed completely, the PTL 132 releases the signal D[0] through the frontend I/F 137, also referred to as a response busy clear (R1b), to indicate that the write task has been executed completely. It is to be understood that the processing unit 111 may issue another command pair CMD44 and CMD45 with relevant arguments describing another task, or other commands, through the command line of the host I/F 115 during the user data transmission from the host side to the device side through the data lines D[7:0].

For a read task that has been ready in the command queue, refer to FIG. 5C. Specifically, the processing unit 111 when executing a driver may issue a command CMD46 with relevant arguments including information about a task number and others to the PTL 132 through the command line of the host I/F 115 for triggering a specific data transmission job performed by the device side. After a predefined time period (time points t54 to t55), the PTL 132 may send user data of the corresponding task to the host side through the data lines D[7:0] of the frontend I/F 137. It is to be understood that the processing unit 111 may issue another command pair CMD44 and CMD45 with relevant arguments describing another task, or other commands, through the command line of the host I/F 115 during the user data transmission from the device side to the host side through the data lines D[7:0].

Those skilled in the art realize that the device side can freely arrange the execution order for the tasks of the command queue, other than that for the package-read/write commands.

In some implementations, in response to the simple read/write commands, the package-read/write commands and command queues described above, three different sets of the PTL and FTL are designed and each set corresponds to one kind of the host IO commands in execution. However, it is not easy to maintain firmware modules for dealing with different protocols. For example, when some algorithms of firmware modules that support one kind of the host IO commands are changed, corresponding algorithms of other firmware modules also need to be changed to avoid unexpected errors during execution due to the inconsistent algorithms therebetween. Moreover, larger non-volatile space is required to store three sets of PTL and FTL, for example, a Read-Only Memory (ROM, not shown in FIG. 1) or the SRAM 135 of the controller 130, or the storage unit 153 of the storage device 150.

Figure 6:
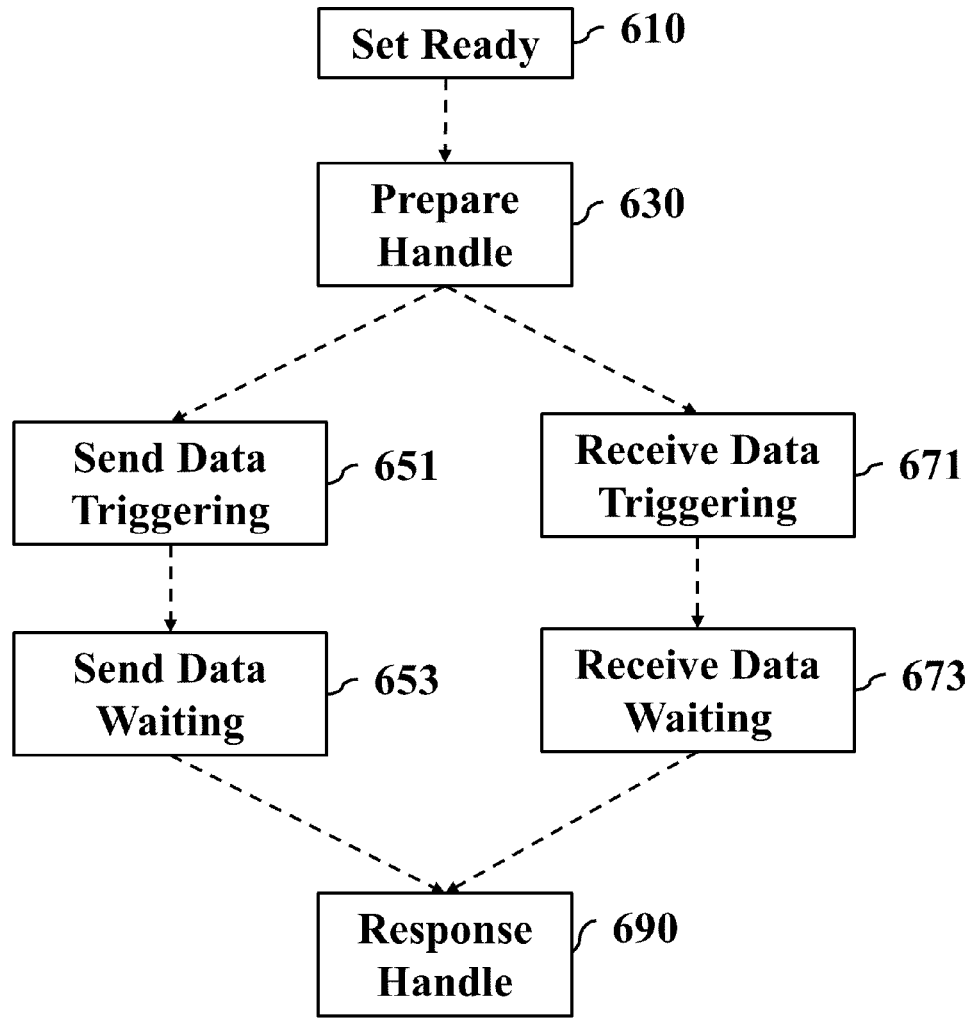
FIG. 6 is a schematic diagram illustrating generic stages according to an embodiment of the invention.

To address the aforementioned technical problems, embodiments of the invention disclose one set of firmware modules (for example, including PTL and FTL) to deal with different types of host IO commands. Refer to FIG. 6. To respond to different types of host IO commands, such as CMD24, CMD25, CMD17, CMD18, CMD46, CMD47, etc., the processing unit 131 when executing the PTL 132 and FTL 133 uses multiple stages of a generic framework (referred to as generic stages for brevity) to drive the frontend I/F 137 to interact with the host side 110 for transmitting user data read from the storage unit 153 to the host 110 and receiving user data to be programmed into the storage unit 153 from the host side 110. The generic stages include but not limit to: set ready 610; prepare handle 630; send data triggering 651; send data waiting 653; get data triggering 671; get data waiting 673; and response handle 690. The generic stages include a write path and a read path, the write path is used to receive user data that will be programmed into the storage unit 153 from the host side 110 for responding to a host write command, and the read path is used to transmit user data that is read from the storage unit 153 to the host side 110 for responding to a host read command. The executions of host read commands, such as CMD25, CMD24, CMD23, CMD13+CMD47, etc., are undergone but not limited to five stages: set ready 610; prepare handle 630; get data triggering 671; get data waiting 673 and response handle 690. The executions of host write commands, such as CMD18, CMD17, CMD13+CMD46, etc., are undergone but not limited to five stages: set ready 610; prepare handle 630; send data triggering 651; send data waiting 653; and response handle 690. The processing unit 131 performs operations relevant to the frontend I/F 137 in each stage for executing the host IO commands and performs other operations, such as specific algorithms of the FTL 133, in time periods between stages.

The set ready stage 610 is provided for dealing with tasks of a command queue. In this stage, no activity relevant to the frontend I/F 137 is conducted for any of the simple read/write commands and the package-read/write commands. That is, in order to use generic stages to unify different types of host IO commands, the executions of the simple write commands, the simple read commands, the package-write commands and the package-read commands go through the set ready stage 610, but no activity is performed. The processing unit 131 may set one or more specific bits of the QSR of the frontend I/F 137 to "1" for a command queue according to an indication made by the FTL 133, enabling the PTL 132 to reply to the host side 110 with the up-to-date ready states in response to the command CMD13 issued by the host side 110 in the future.

The prepare handle stage 630 is provided for dealing with the simple read/write commands, the package-read/write commands, and the tasks of the command queues. To respond to the host write commands CMD24, CMD25, CMD23 or CMD47 issued by the host side 110, the processing unit 131 pulls the data line D[0] low through the frontend I/F 137 (at, for example, the time point t30 as shown in FIG. 3A, t40 as shown in FIG. 4A, or t50 as shown in FIG. 5B) to gain the control of the data line D[0]. Subsequently, a series of preparation operations are performed, for example, allocating space of the SRAM 135 for storing user data to be programmed, setting registers of the frontend I/F 137 for notifying the DMA controller of the frontend I/F 137 how many LBAs of user data are to be received from the host side 110, and the address of the allocated space of the SRAM 135, and so on. After the completion of the preparation operations, the processing unit 131 releases the data line D[0] through the frontend I/F 137 (at, for example, the time point t31 as shown in FIG. 3A, t41 as shown in FIG. 4A or t51 as shown in FIG. 5B) to release the control of the data line D[0]. To respond to the host read commands CMD17, CMD18 or CMD46 issued by the host side 110, the processing unit 131 may perform a series of preparation operations, for example, setting registers of the frontend I/F 137 for notifying the DMA controller of the frontend I/F 137 how many LBAs of user data are to be sent to the host side 110, and the address of the allocated space of the SRAM 135 for storing user data to be replied with, and so on, during a predefined time period (for example, the time points from t34 to t35 as shown in FIG. 3B, from t44 to t45 as shown in FIG. 4B, or from t54 to t55 as shown in FIG. 5C).

The processing unit 131 in the send data triggering stage 651 triggers the DMA controller of the frontend I/F 137 to start a transmission of user data to the host side 110 on the data lines D[7:0], and in the get data triggering stage 671 triggers the DMA controller of the frontend I/F 137 to start a reception of user data from the host side 110 on the data lines D[7:0].

The processing unit 131 in the send data waiting stage 653 periodically inspects a transmission counter of the frontend I/F 137 to determine whether the DMA controller has transmitted all user data completely, and in the get data waiting stage 753 periodically inspects a reception counter of the frontend I/F 137 to determine whether the DMA controller has received all user data completely.

After the DMA controller transmits or receives all user data completely, the processing unit 131 in the response handle stage 690 inspects a relevant register of the frontend I/F 137 to determine whether an error has occurred during the user data transmission or reception. If so, the processing unit 131 replies a proper error message to the host side 110 through the frontend I/F 137. When the DMA controller transmits all user data to the device side completely and no error has occurred, the processing unit 131 pulls the data line D[0] low through the frontend I/F 137 (at, for example, the time point t32 as shown in FIG. 3A, t42 as shown in FIG. 4A, or t52 as shown in FIG. 5B) to notify the host side 110 that the device side is busy for programming the user data. After the programming operation for the user data is done, the processing unit 131 releases the data line D[0] through the frontend I/F 137 (at, for example, the time point t33 as shown in FIG. 3A, t43 as shown in FIG. 4A, or t53 as shown in FIG. 5B) to release the control of the data line D[7:0].

Figure 7:
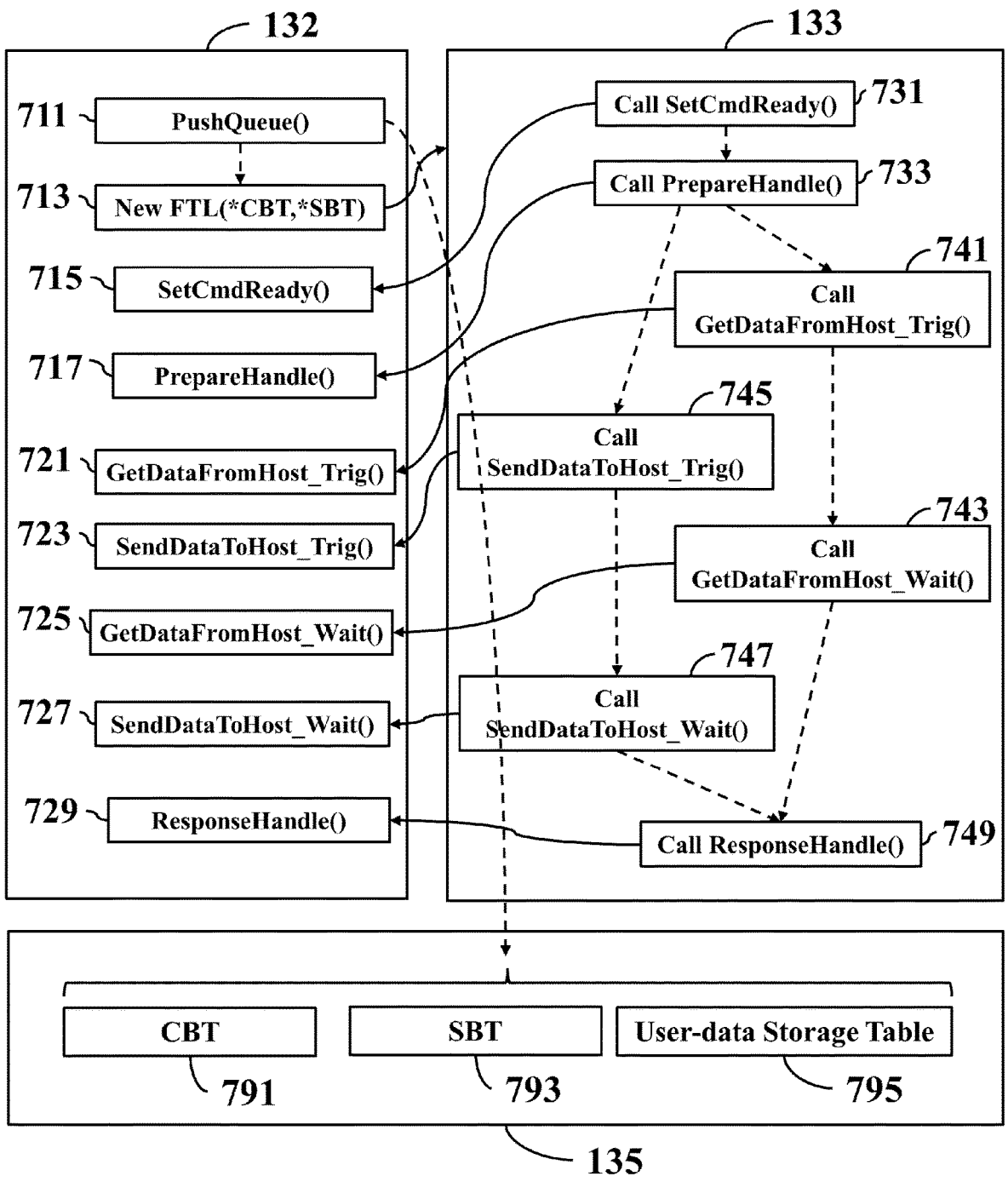
FIG. 7 is a schematic diagram illustrating function executions of generic stages according to an embodiment of the invention.

Since the FTL 133 includes a variety of algorithms for executing the host IO commands, for example, finding physical addresses corresponding to LBAs, decrypting the read-out data, inspecting the accuracy of the read-out data, generating LDPC code, CRC and Error Check and Correction (ECC) code optionally with the aid of the hardware engine 136, and so on, the FTL 133 has heavy workload. In some embodiments, refer to FIG. 7. To balance the workload, the PTL 132 may provide callback functions 715, 717, 721, 723, 725, 727 and 729, including the operations of the aforementioned stages to the frontend I/F 137 described above, to the FTL 133 to avoid the FTL 133 to spend excessive time and computation resources running the generic stages. Specifically, the PTL 132 includes the function PushQueue( ) 711 when being executed by the processing unit 131 to interpret the host IO commands received through the frontend I/F 137 and determine whether the host IO commands form a simple read/write command, a package-read/write command or a command queue. Subsequently, the function PushQueue( ) 711 generates a command bit table (CBT) 791, a slot bit table (SBT) 793 and a user-data storage table 795 according to the interpreted host IO commands, and stores them in the SRAM 135.

Due to the formation of the simple read/write commands, package-read/write commands and command queue requires interchanges of different types of messages and may include one or more read, write operations, or any combination thereof, the CBT 791 allows the PTL 133 to integrate different types of read and write operations into a common format for easy management. In order to merge the simple read/write commands, the package-read/write commands and the command queues, the CBT 791 may include 32 entries. Each entry is associated with an IO operation and includes at least two fields: the first field storing a valid flag; and the second field storing a command type ("0" represents a read operation, "1" represents a write operation, and "2" represents an erase operation). The default values of the valid flag and the command type are NULLs. When receiving a simple write command (for example, CMD24/25, in which no indicator of a packed command is included), the function PushQueue( ) 711 stores "1" and "1" in the two fields of the $0^{th}$ entry of the CBT 791, respectively. When receiving a simple read command (for example, CMD17/18, in which no indicator of a packed command is included), the function PushQueue( ) 711 stores "1" and "0" in the two fields of the $0^{th}$ entry of the CBT 791, respectively. When receiving a package-write command (for example, a package header carrying information about multiple data packs to be written), the function PushQueue( ) 711 stores "1" and "1" in the two fields of the $0^{th}$ to the $(m-1)^{th}$ entries of the CBT 791, respectively, where m represents the quantity of the data packs. When receiving a package-read command (for example, a package header carrying information about multiple data packs to be read), the function PushQueue( ) 711 stores "1" and "0" in the two fields of the $0^{th}$ to the $(n-1)^{th}$ entries of the CBT 791, respectively, where n represents the quantity of the data packs. When receiving a command queue (for example, task information indicated by one or more pairs of CMD44 and CMD45), the function PushQueue( ) 711 stores "1" and "0" or "1" and "1" in the two fields of the $p^{th}$ entry of the CBT 791, respectively, according to the task number p and the task type carried in the arguments of each command pair. Table 1 describes a CBT for an exemplary command queue:

TABLE 1

| Valid Flag | Command Type |
|---|---|
| 1 | 0 |
| 1 | 1 |
| 1 | 0 |

TABLE 1-continued

| Valid Flag | Command Type |
|---|---|
| 1 | 0 |
| 1 | 0 |
| 1 | 1 |
| 1 | 1 |
| 1 | 1 |
| 1 | 1 |
| 1 | 1 |
| 1 | 1 |

Table 1 lists the $0^{th}$ to the $10^{th}$ entries only as an example to indicate the command queue include 11 tasks (numbered from 0), in which the $1^{st}$, the $2^{nd}$ to the $4^{th}$ tasks are read tasks, and the remaining are write tasks.

Additionally, the CBT 791 may support host erase commands. When detecting a simple erase command (for example, receiving CMD35/36/38), the function PushQueue( ) 711 stores "1" and "2" in the two fields of the $0^{th}$ entry of the CBT 791, respectively. When receiving an erase command for a specific task of the command queue (for example, CMD48), the function PushQueue( ) 711 stores "1" and "2" in the two fields of the corresponding entry of the CBT 791, respectively.

Figure 8A:
FIGS. 8A to 8C are schematic diagrams illustrating different partitions for a range of logical block addresses (LBAs) according to an embodiment of the invention.
Figure 8B:
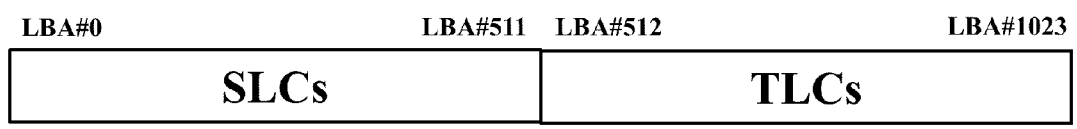
Figure 8C:
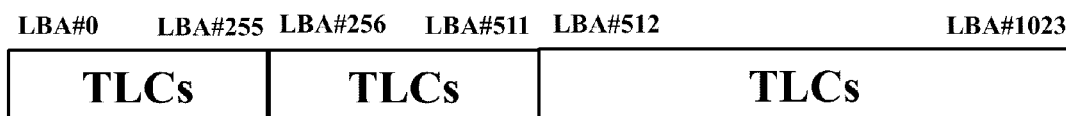

The host device 110 may divide a range of LBAs of user data into multiple partitions and designate to store each partition in one kind of memory units, such as SLCs, MLCs, TLCs or QLCs. For example, refer to the partitions as shown in FIG. 8A. The user data of LBA #0 to LBA #1023 are designated to store in TLCs. Refer to the partitions as shown in FIG. 8B. The user data of LBA #0 to LBA #511 are designated to store in SLCs and the user data of LBA #512 to LBA #1023 are designated to store in TLCs. Refer to the partitions as shown in FIG. 8C. The user data of LBA #0 to LBA #255, LBA #256 to LBA #511 and LBA #512 to LBA #1023 are designated to store in TLCs, SLCs and TLCs, respectively.

To improve the access performance, the PTL 132 may divide one operation across two kinds of memory cells, or more, thereby enabling each divided operation to access to the same kind of memory cells. Taking an example as shown in FIG. 8C, the write operation for LBA #0 to LBA #1023 may be divided into three operations for writing user data of LBA #0 to LBA #255, LBA #256 to LBA #511 and LBA #512 to LBA #1023, respectively. The function PushQueue( ) 711 may check whether each valid operation is across at least two kinds of memory units according to memory cell configurations for LBAs managed by the host side 110. If so, then the satisfied valid operation is divided into multiple operations. Subsequently, the function PushQueue( ) 711 generates the SBT 793 according to the dividing results, enabling the FTL 133 to arrange and execute operations for accessing to user data according to the content of the SBT 793. The SBT 793 may include 96 entries. Each entry is associated with one divided IO operation and includes at least four fields: The first field stores a read flag ("0" represents not read, "1" represents a read). The second field stores a write flag ("0" represents not write, "1" represents a write). The third field stores an erase flag ("0" represents not erase, "1" represents an erase). The fourth field stores an entry number of the CBT 791 to associate this divided IO operation with a specific operation of the CBT 791. Following the example as shown in Table 1, assume that the fourth task requests to write user data of a LBA range across TLCs, SLCs and TLCs in sequence and the fifth task requests to read user data of a LBA range across TLCs, SLCs and TLCs in sequence. Table 2 describes an exemplary SBT generated according to the CBT of Table 1:

TABLE 2

| Read Flag | Write Flag | Erase Flag | Associated entry number |
|---|---|---|---|
| 1 | 0 | 0 | 0 |
| 0 | 1 | 0 | 1 |
| 1 | 0 | 0 | 2 |
| 1 | 0 | 0 | 3 |
| 1 | 0 | 0 | 4 |
| 1 | 0 | 0 | 4 |
| 1 | 0 | 0 | 4 |
| 0 | 1 | 0 | 5 |
| 0 | 1 | 0 | 5 |
| 0 | 1 | 0 | 5 |
| 0 | 1 | 0 | 6 |
| 0 | 1 | 0 | 7 |
| 0 | 1 | 0 | 8 |
| 0 | 1 | 0 | 9 |
| 0 | 1 | 0 | 10 |

Table 2 lists the $0^{th}$ to the $14^{th}$ records only to indicate the divided 15 operations (numbered from 0), in which the $4^{th}$ to the $6^{th}$ entries record information about sub-operations divided from the $4^{th}$ operation of the CBT 791 and the $7^{th}$ to the $9^{th}$ entries record information about sub-operations divided from the $5^{th}$ operation of the CBT 791.

Additionally, the function PushQueue( ) 711 generates a user-data storage table 795 for recording arguments of each operation of the SBT 793. The user-data storage table 795 may include 96 entries. Each entry of the user-data storage table 795 is associated one entry of the SBT 793 and includes at least four fields: the first field storing an entry number of the SBT 793 for associating with a specific operation of the SBT 793; the second field storing a start LBA number; the third field storing a length of data to be accessed; and the fourth field storing a memory address of the SRAM 135 that is allocated for this operation as a data buffer for data to be programmed into or read.

Refer back to FIG. 7. After the function PushQueue( ) has been executed completely, the processing unit 131 loads and executes an instruction 713 to generate a new thread of the FTL 133. The PTL 132 may send the addresses of the callback functions 715, 717, 721, 723, 725, 727 and 729 to the thread of the FTL 133, enabling the thread of the FTL 133 to call these functions. Furthermore, the PTL 132 may send a command type (such as, the simple IO command, the package IO command, the command queue, etc.), the CBT 791, the SBT 793 and the user-data storage table 795 to the thread of the FTL 133, enabling the thread of the FTL 133 to complete a designated IO operation accordingly. The FTL 132 implements functions SetCmdReady( ) 715, PrepareHandle( ) 717, GetDataFromHost_Trig( ) 721, SendDataToHost_Trig( ) 723, GetDataFromHost_Wait( ) 725, SendDataToHost_Wait( ) 727 and ResponseHandle( ) 729 for completing jobs as recited in the set ready stage 610, the prepare handle stage 630, the get data triggering stage 671, the send data triggering 651, the get data waiting stage 673, the send data waiting stage 653 and the response handle stage 690, respectively. During an execution for each write operation of the SBT 793, the FTL 133 may call the functions SetCmdReady( ) 715, PrepareHandle( ) 717, GetDataFromHost_Trig( ) 721, GetDataFromHost_Wait( ) 725 and ResponseHandle( ) 729 in sequence to complete a series of interactions with the host side 110 through the frontend I/F 137. During an execution for each read operation of the SBT 793, the FTL 133 may call the functions SetCm-dReady( ) 715, PrepareHandle( ) 717, SendDataToHost_Trig( ) 723, SendDataToHost_Wait( ) 727 and ResponseHandle( ) 729 in sequence to complete a series of interactions with the host side 110 through the frontend I/F 137. The PTL 132 may store information about the created thread is associated with which kind of the IO commands in the SRAM 135, so as to know that which kind of IO command is being executed by the thread of the FTL 133 when any function described above receives a function call from the thread of the FTL 133.

Specifically, after receiving a function call from a thread of the FTL 133, the SetCmdReady( ) 715 sets a designated bit of the QSR of the frontend I/F 137 for a command queue to indicate that a corresponding task of the command queue is ready, and does not perform any activity for a simple write command, a simple read command, a package-write command or a package-read command.

After receiving a function call from a thread of the FTL 133, the function PrepareHandle( ) 717 practices the prepare handle stage 630. After receiving a function call from a thread of the FTL 133, the function GetDataFromHost_Trig( ) 721 practices the get data triggering stage 671. After receiving a function call from a thread of the FTL 133, the function SendDataToHost_Trig( ) 723 practices the send data triggering stage 651.

After receiving a function call from a thread of the FTL 133, the function GetDataFromHost_Wait( ) 725 may check the transmission counter of the frontend I/F 137 to determine whether the DMA controller has transmitted user data completely for a simple read command, a pack of a package-read command, or a read task of a command queue, and reply to the thread of the FTL 133 with the determination result. After receiving a function call from a thread of the FTL 133, the function SendDataToHost_Wait( ) 727 may check the reception counter of the frontend I/F 137 to determine whether the DMA controller has received user data completely for a simple write command, a pack of a package-write command, or a write task of a command queue, and reply to the thread of the FTL 133 with the determination result.

After receiving a function call from a thread of the FTL 133, the function RespnseHandle( ) 729 may drive the frontend I/F 137 to pull the data line D[0] low for a predefined time period for performing a write operation in response to a simple write command, a pack of a package-write command, or a write task of a command queue, and release the data line D[0] after the time period has elapsed.

Figure 9:
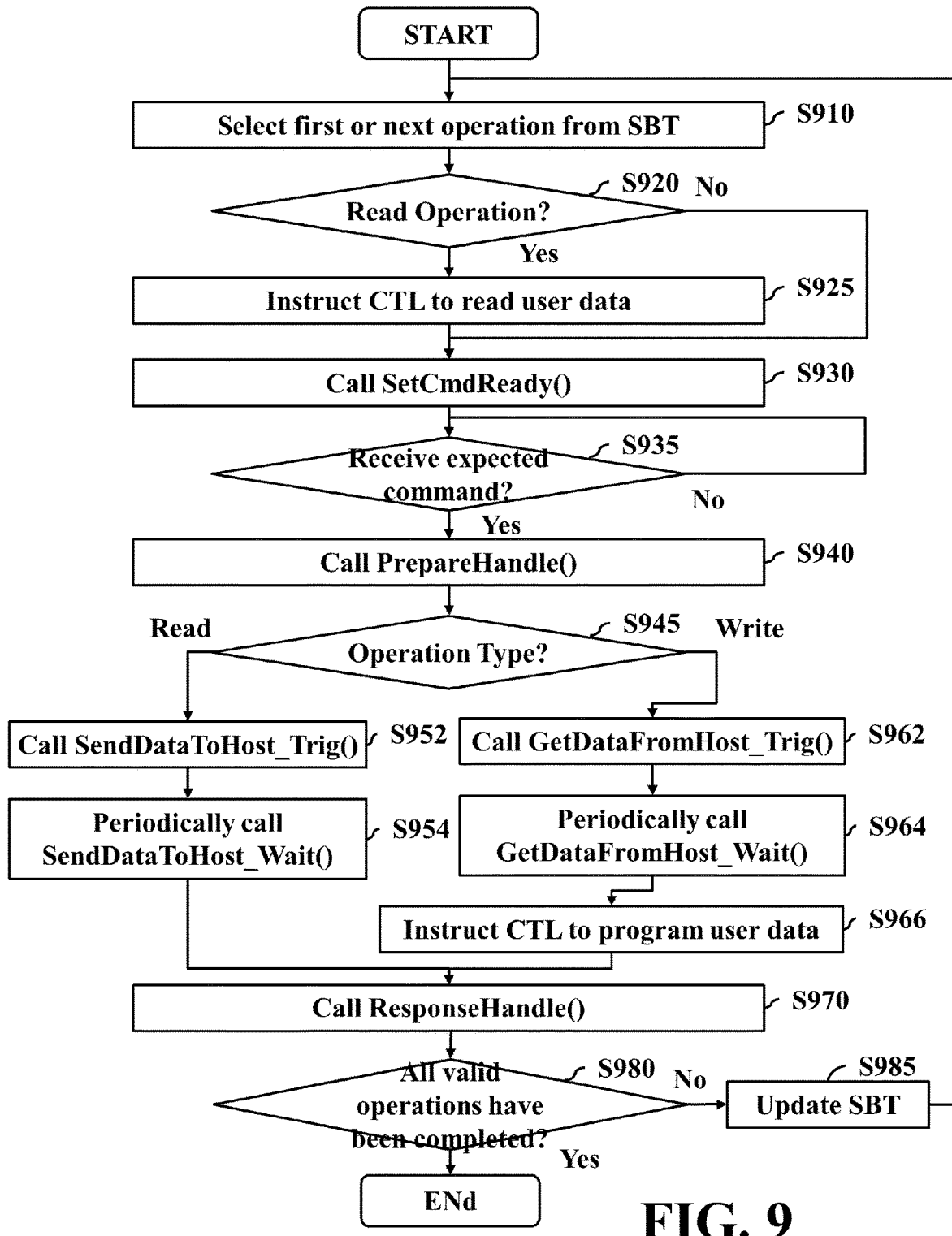
FIG. 9 is a flowchart illustrating a method for executing host Input-Output (IO) commands according to an embodiment of the invention.

The execution details of a thread of the FTL 133 may refer to a flowchart as shown in FIG. 9. The method uses multiple stages of a generic framework to drive the frontend I/F 137 to interact with the host side 110 for responding to various types of host IO commands to transmit user data read from the storage unit 153 to the host side 110 and receiving user data to be programmed into the storage unit 153 from the host side 110. The processing unit 131 when executing the FTL 133 repeatedly executes a loop (steps S910 to S985) until all the valid operations of the SBT 793 have been completed (the "Yes" path of step S980). In each iteration, the thread of the FTL 133 processes one valid operation of the SBT 793. Details are described as follows:

Step S910: The first or the next operation is selected from the SBT 793. The operation selection may follow the rules described below for responding to characteristics of different host IO commands. The thread of the FTL 133 selects the next sub-operation when the last executed one is a sub-operation and any other sub-operation has not been completed. For example, the thread of the FTL 133 selects the read operation indicated in the 5$^{th}$ entry of Table 2 when the last executed operation is the read operation indicated in the 4$^{th}$ entry of Table 2. The thread of the FTL 133 selects an operation according to the entry order of the SBT 793 when its command type is the package IO command. The thread of the FTL 133 selects an operation in an arbitrary entry of the SBT 793 according to performance requirements when its command type is a command queue.

Step S920: It is determined whether the selected operation is a read operation. If so, the process proceeds to step S925. Otherwise, the process skips step S925 and proceeds to step S930. The thread of the FTL 133 completes the determination by checking the read flag of the SBT 793 corresponding to the selected operation.

Step S925: The CTL 134 is instructed to read user data of a designated LBA from the storage unit 153 through the backend I/F 139 according to the content of the corresponding entry of the user-data storage table 795, and store the read data in a designated address of the SRAM 135. The FTL 133 may perform necessary algorithms with the aid of the hardware engine 136 for the reading of the user data, for example, searching a physical address corresponding to the LBA, decrypting the read data, inspecting the accuracy of the read data, conducting an error correction when the read data has error bits, or any combination thereof.

Step S930: The function SetCmdReady( ) is called to instruct the PTL 132 to complete the activities of the set ready stage 610. The thread of the FTL 133 may use a parameter to carry an SBT number of the selected operation to the PTL 132. For example, with references made to Tables 1 and 2, the thread of the FTL 133 notify the PTL 132 of information indicating that the 0$^{th}$ task of the SBT 739 is ready when user data corresponding to the 0$^{th}$ entry of the SBT 793 has been read. Subsequently, the function SetCmdReady( ) implemented in the PTL 132 may query the SBT 793 to recognize that the 0$^{th}$ task of the SBT 793 is associated with the 0$^{th}$ task of CBT 791, and set the 0$^{th}$ bit of the QSR to "1" to notify the host side 110 that the 0$^{th}$ task of the command queue is ready. In order to eliminate the program complexity resulting from the addition of the determination conditions, the thread of the FTL 133 still calls the function SetCmdReady( ), but the PTL 132 does not perform any activity when the type of the selected operation is related to a simple IO command or a package IO command.

Step S935: It is determined whether the expected command has been received. If so, the process proceeds to step S940. Otherwise, the process conducts the next determination of step S935 after a predefined time period. For example, if the PTL 132 has been instructed to set the 0$^{th}$ bit of the QSR to "1", then the thread of the FTL 133 expects to receive a host IO command corresponding to the 0$^{th}$ entry of the SBT 793, such as the command CMD25 of FIG. 3A, the command CMD18 of FIG. 3B, the command CMD25 of FIG. 4A, the command CMD18 of FIG. 4B, the command CMD47 of FIG. 5B, the command CMD46 of FIG. 5C, or the similar, to continue the following steps. The thread of the FTL 133 may query the PTL 132 whether a command corresponding to the selected operation that has been indicated in a ready state. The process determines that the expected command has been received when the PTL 132 replies to the thread of the FTL 133 with "Yes".

Step S940: The function PrepareHandle( ) is called to instruct the PTL 132 to complete the activities of the prepare handle stage 630.

Step S945: It is determined whether the operation type of the selected operation is a read operation or a write operation. The process proceeds to step S952 when the operation type is a read operation. The process proceeds to step S962 when the operation type is a write operation.

Step S952: The function SendDataToHost_Trig( ) is called to instruct the PTL 132 to complete the activities of the send data triggering stage 651.

Step S954: The function SendDataToHost_Wait( ) is called to instruct the PTL 132 to complete the activities of the send data waiting stage 653 until the user data has been sent completely.

Step S962: The function GetDataFromHost_Trig( ) is called to instruct the PTL 132 to complete the activities of the get data triggering stage 671.

Step S964: The function GetDataFromHost_Wait( ) is called to instruct the PTL 132 to complete the activities of the get data waiting stage 673 until the user data has been received completely.

Step S966: The CTL 134 is instructed to program user data of a designated LBA at a specified address of the SRAM 15 into the storage unit 153 through the backend I/F 139 according to the content of the corresponding entry of the user-data storage table 795. It is to be understood that the process may omit this step if the device side is operated in a cache mode. Those skilled in the art may revise the process to use other algorithms to merge all or a portion of the user data of the SRAM 135 that waits to be programmed at a proper time point later, and then, program the merged user data into the storage unit 153 in one or more batches, and the invention should not be limited thereto. The FTL 133 may perform necessary algorithms with the aid of the hardware engine 136 for the programming of the user data, for example, encrypting the user data, generating the LDPC code, CRC or ECC code corresponding to the user data, or any combination thereof.

Step S970: The function ResponseHandle( ) is called to instruct the PTL 132 to complete the activities of the response handle stage 690.

Step S980: It is determined whether all valid operations of the SBT 793 have been completed. If so, the process ends. Otherwise, the process proceeds to step S985.

Step S985: The PTL 132 is requested to update the SBT 793. Since the host side 110 can issue further command pairs CMD44 and CMD45 with relevant arguments for describing tasks during the transmission and reception of user data, the SBT 793 may record more operations that have not processed than the last update. Thus, the thread of the FTL 133 may request the PTL 132 to provide the up-to-date SBT 793 each time one operation has been executed completely. It is to be understood that step S985 is unnecessary to be arranged after an execution completion for one operation only, and more steps for updating the SBT 793 may be arranged in arbitrary places of the flowchart. If the thread of the FTL 133 executes operations according to the entries of the SBT 793 that are received in the beginning but updates the SBT 793 during the executions, then the thread of the FTL 133 is deleted after the operations of the originally received SBT 793 have been completely executed. Unfortunately, tasks indicted by command pairs CMD44 and CMD45 with relevant arguments that are received during the user-data transmission and reception for the originally received SBT 793, are executed by another new thread of the FTL 133 that is created by the PTL 132. The overall performance is degraded when unnecessary computation power is consumed for the thread deletion and regeneration described above.

Some or all of the aforementioned embodiments of the method of the invention may be implemented in a computer program such as a driver for a dedicated hardware, a PTL, an FTL or a CTL of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIG. 1, it should be noted that additional elements may be included to achieve better performance without departing from the spirit of the invention. Each element of FIG. 1 is composed of various circuits and arranged to operably perform the aforementioned operations. While the process flows described in FIG. 9 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for executing host input-output (IO) commands, performed by a processing unit of a device side when loading and executing program code of a first layer, comprising:
    receiving a slot bit table (SBT) comprising an entry from a second layer, wherein each entry is associated with an IO operation;
    receiving a plurality of addresses of callback functions from the second layer, wherein the callback functions are implemented for a plurality of stages of a generic framework in response to different types of host IO commands; and
    repeatedly executing a loop until IO operations of the SBT have been processed completely, and, in each iteration of the loop, calling the callback functions implemented in the second layer for a write operation or a read operation of the SBT to drive the frontend interface through the second layer to interact with the host side to transmit user data read from a storage unit to the host side, or receive user data to be programmed into the storage unit from the host side.

2. The method of claim 1, comprising, in each iteration of the loop, requesting the second layer to update the SBT.

3. The method of claim 1, wherein the SBT comprises a first entry and a second entry generated according to a host IO command, the host IO command requests to write or read user data of a logical block address (LBA) range across a first type of memory cells and a second type of memory cells, the first entry indicates to write or read user data of a first address range thereof including the first type of memory cells, and the second entry indicates to write or read user data of a second address range thereof including the second type of memory cells.

4. A non-transitory computer program product for executing host input-output (IO) commands when executed by a processing unit of a device side, the non-transitory computer program product comprising program code of a first layer to:
    receive a slot bit table (SBT) comprising an entry from a second layer, wherein each entry is associated with an IO operation;
    receive a plurality of addresses of callback functions from the second layer, wherein the callback functions are implemented for a plurality of stages of a generic framework in response to different types of host IO commands; and
    repeatedly execute a loop until IO operations of the SBT have been processed completely, and, in each iteration of the loop, call the callback functions implemented in the second layer for a write operation or a read operation of the SBT to drive the frontend interface through the second layer to interact with the host side to transmit user data read from a storage unit to the host side, or receive user data to be programmed into the storage unit from the host side.

5. The non-transitory computer program product of claim 4, comprising program code of the first layer to:
    in each iteration of the loop, request the second layer to update the SBT.

6. The non-transitory computer program product of claim 4, wherein the SBT comprises a first entry and a second entry generated according to a host IO command, the host IO command requests to write or read user data of a logical block address (LBA) range across a first type of memory cells and a second type of memory cells, the first entry indicates to write or read user data of a first address range thereof including the first type of memory cells, and the second entry indicates to write or read user data of a second address range thereof including the second type of memory cells.

7. The non-transitory computer program product of claim 4, wherein the host IO commands comprise a simple write command, a simple read command, a package-write command, a package-read command, and a command queue, the simple write command instructs the device side to write user data of one or more logical block addresses (LBAs), the simple read command instructs the device side to read user data of one or more LBAS, the package-write command instructs the device side to write a plurality of packs of user data, the package-read command instructs the device side to read a plurality of packs of user data, each pack of user data is associated with one or more LBAs, an execution order for the packs of the package-write command or the package-read command cannot be altered, the command queue comprises a plurality of tasks, and each task instructs the device side to read or write user data of one or more LBAs.

8. The non-transitory computer program product of claim 7, wherein the callback functions comprise a first function implemented for a set ready stage, the non-transitory computer program product comprising program code of the first layer to:
    in each iteration of the loop, call the first function to notify the second layer of information indicating that an IO operation of the SBT is ready.

9. The non-transitory computer program product of claim 8, wherein the first function sets a bit of a queue state register of the frontend interface for the command queue to indicate that a corresponding task of the command queue is ready;

and conducts no activity relevant to the frontend interface for each of the simple write command, the simple read command, the package-write command and the package-read command.

10. The non-transitory computer program product of claim 9, wherein the frontend interface comprises a command line and a plurality of data lines connected to the host side, the callback functions comprise a second function implemented for a prepare handle stage, in which, for responding to the simple write command, the simple read command, a pack of the package-write command or the package-read command, or a task of the command queue, drives the frontend interface to pull one data line low for a time period for performing a series of preparation operations, and release the data line after a completion of the preparation operations, the non-transitory computer program product comprising program code of the first layer to:

in each iteration of the loop, call the second function when the set ready stage has been completed and the second layer has received a host IO command corresponding to the read operation or the write operation.

11. The non-transitory computer program product of claim 10, wherein the callback functions comprise a third function implemented for a send data triggering stage and a fourth function implemented for a send data waiting stage, the third function, for responding to the simple read command, the pack of the package-read command, or a read task of the command queue, triggers a direct memory access (DMA) controller of the frontend interface to start a transmission of user data to the host side on the data lines, and the fourth function, for responding to the simple read command, the pack of the package-read command, or the read task of the command queue, inspects a transmission counter of the frontend interface to determine whether the DMA controller has transmitted user data completely, and replies with a determination result, the non-transitory computer program product comprising program code of the first layer to:

in an iteration of the loop for performing a read operation, call the third function after the prepare handle stage has been completed; and in the iteration of the loop for performing the read operation, periodically call the fourth function after the send data triggering stage has been completed until user data has been transmitted to the host side completely.

12. The non-transitory computer program product of claim 10, wherein the callback functions comprise a third function implemented for a get data triggering stage, a fourth function implemented for a get data waiting stage and a fifth function implemented for a response handle stage, the third function, for responding to the simple write command, a pack of the package-write command, or a write task of the command queue, triggers a direct memory access (DMA) controller of the frontend interface to start a reception of user data from the host side on the data lines, the fourth function, for responding to the simple write command, the pack of the package-write command, or the write task of the command queue, inspects a reception counter of the frontend interface to determine whether the DMA controller has received user data completely, and replies with a determination result, and the fifth function, for responding to the simple write command, the pack of the package-write command, or the write task of the command queue, drives the frontend interface to pull one data line low for a time period for performing a programming operation, and release the data line after the time period has elapsed, the non-transitory computer program product comprising program code of the first layer to:

in an iteration of the loop for performing a write operation, call the third function after the prepare handle stage has been completed;

in the iteration of the loop for performing a write operation, periodically call the fourth function after the get data triggering stage has been completed until user data has been received from the host side completely; and in the iteration of the loop for performing a write operation, call the fifth function after user data has been received from the host side completely.

13. An apparatus for executing host input-output (IO) commands, comprising:

a frontend interface, coupled to a host side; and a processing unit, coupled to the frontend interface, arranged to operably perform operations when loading and executing program code of a first layer: receiving a slot bit table (SBT) comprising an entry from a second layer, wherein each entry is associated with an IO operation; receiving a plurality of addresses of callback functions from the second layer, wherein the callback functions are implemented for a plurality of stages of a generic framework in response to different types of host IO commands; and repeatedly execute a loop until IO operations of the SBT have been processed completely, wherein, in each iteration of the loop, the processing unit is arranged to operably call the callback functions implemented in the second layer for a write operation or a read operation of the SBT to drive the frontend interface through the second layer to interact with the host side to transmit user data read from a storage unit to the host side, or receive user data to be programmed into the storage unit from the host side.

14. The apparatus of claim 13, wherein the processing unit is arranged to operably, in each iteration of the loop, request the second layer to update the SBT.

15. The apparatus of claim 13, wherein the SBT comprises a first entry and a second entry generated according to a host IO command, the host IO command requests to write or read user data of a logical block address (LBA) range across a first type of memory cells and a second type of memory cells, the first entry indicates to write or read user data of a first address range thereof including the first type of memory cells, and the second entry indicates to write or read user data of a second address range thereof including the second type of memory cells.

16. The apparatus of claim 13, wherein the host IO commands comprise a simple write command, a simple read command, a package-write command, a package-read command, and a command queue, the simple write command instructs the apparatus to write user data of one or more logical block addresses (LBAs), the simple read command instructs the apparatus to read user data of one or more LBAS, the package-write command instructs the apparatus to write a plurality of packs of user data, the package-read command instructs the apparatus to read a plurality of packs of user data, each pack of user data is associated with one or more LBAs, an execution order for the packs of the package-write command or the package-read command cannot be altered, the command queue comprises a plurality of tasks, and each task instructs the apparatus to read or write user data of one or more LBAs.

17. The apparatus of claim 16, wherein the callback functions comprise a first function implemented for a set ready stage, the first function sets a bit of a queue state register of the frontend interface for the command queue to indicate that a corresponding task of the command queue is ready, and conducts no activity relevant to the frontend interface for each of the simple write command, the simple read command, the package-write command and the package-read command, and the processing unit is arranged to operably, in each iteration of the loop, call the first function to notify the second layer of information indicating that an IO operation of the SBT is ready.

18. The apparatus of claim 17, wherein the frontend interface comprises a command line and a plurality of data lines connected to the host side, the callback functions comprise a second function implemented for a prepare handle stage, in which, for responding to the simple write command, the simple read command, a pack of the package-write command or the package-read command, or a task of the command queue, drives the frontend interface to pull one data line low for a time period for performing a series of preparation operations, and release the data line after a completion of the preparation operations, and the processing unit is arranged to operably, in each iteration of the loop, call the second function when the set ready stage has been completed and the second layer has received a host IO command corresponding to the read operation or the write operation.

19. The apparatus of claim 18, wherein the callback functions comprise a third function implemented for a send data triggering stage and a fourth function implemented for a send data waiting stage, the third function, for responding to the simple read command, the pack of the package-read command, or a read task of the command queue, triggers a direct memory access (DMA) controller of the frontend interface to start a transmission of user data to the host side on the data lines, the fourth function, for responding to the simple read command, the pack of the package-read command, or the read task of the command queue, inspects a transmission counter of the frontend interface to determine whether the DMA controller has transmitted user data completely, and replies with a determination result, and the processing unit is arranged to operably, in an iteration of the loop for performing a read operation, call the third function after the prepare handle stage has been completed, and periodically call the fourth function after the send data triggering stage has been completed until user data has been transmitted to the host side completely.

20. The apparatus of claim 18, wherein the callback functions comprise a third function implemented for a get data triggering stage, a fourth function implemented for a get data waiting stage and a fifth function implemented for a response handle stage, the third function, for responding to the simple write command, a pack of the package-write command, or a write task of the command queue, triggers a direct memory access (DMA) controller of the frontend interface to start a reception of user data from the host side on the data lines, the fourth function, for responding to the simple write command, the pack of the package-write command, or the write task of the command queue, inspects a reception counter of the frontend interface to determine whether the DMA controller has received user data completely, and replies with a determination result, the fifth function, for responding to the simple write command, the pack of the package-write command, or the write task of the command queue, drives the frontend interface to pull one data line low for a time period for performing a programming operation, and release the data line after the time period has elapsed, and the processing unit is arranged to operably, in an iteration of the loop for performing a write operation, call the third function after the prepare handle stage has been completed, periodically call the fourth function after the get data triggering stage has been completed until user data has been received from the host side completely, and call the fifth function after user data has been received from the host side completely.

* * * * *